United States Patent [19]

Fournier

[11] Patent Number: 5,626,816
[45] Date of Patent: May 6, 1997

[54] SILVER RECOVERY SYSTEM

[76] Inventor: Jean G. Fournier, P.O. Box 238, Marble Falls, Tex. 78654

[21] Appl. No.: 511,617

[22] Filed: Aug. 7, 1995

[51] Int. Cl.⁶ .................................................. C22B 3/00
[52] U.S. Cl. .............................. 266/170; 266/101
[58] Field of Search ............................ 266/170, 101; 75/713

[56] References Cited

U.S. PATENT DOCUMENTS

| | | | |
|---|---|---|---|
| 2,905,323 | 9/1959 | Megesi | 266/170 |
| 4,220,320 | 9/1980 | LeGrange | 266/170 |
| 4,325,732 | 4/1982 | Woog | 75/109 |
| 4,842,644 | 6/1989 | Senff | 75/109 |
| 4,854,552 | 8/1989 | Williams | 266/170 |
| 4,997,166 | 3/1991 | Wiggins | 266/170 |
| 5,026,029 | 6/1991 | Peterson | 266/170 |

*Primary Examiner*—Scott Kastler
*Attorney, Agent, or Firm*—Stephen R. Greiner

[57] ABSTRACT

A system for recovering silver as a free metal from silver-bearing liquid. The silver recovery system includes a holding tank for receiving silver bearing liquid having an opening in its top and a removable cover for closing the opening. A pair of silver recovery cartridges are carried by the cover and are connected together for serial flow. Each silver recovery cartridge contains a source of ions above silver in electromotive force series for reacting with silver-bearing liquid so that silver is recovered therein. A pump is secured to the cover for delivering silver-bearing liquid from the holding tank to the silver recovery cartridges.

17 Claims, 3 Drawing Sheets

5,626,816

SILVER RECOVERY SYSTEM

FIELD OF THE INVENTION

The present invention relates generally to apparatus for the recovery of silver as a free metal from depleted photographic processing liquids and the like.

BACKGROUND OF THE INVENTION

As is well known, silver is a basic component of many photographic processing liquids. In the development of most photographic films, papers and the like, the concentration of silver is automatically maintained within a predetermined range by specialized equipment. Excess silver-bearing liquid is discharged by such equipment into waste holding tanks for later disposal.

Most sewage treatment agencies regard silver suspended in photographic fixers and other liquids as a hazardous material. Thus, silver-bearing liquids must be treated to remove substantially all of their silver before the liquid may be deposited into conventional sewage conduits. The concentration of silver permitted to remain in the disposed liquid varies from locality to locality, but generally must fall below 5 parts per million. Many agencies, however, require a lower concentration of silver in a liquid destined for sewer disposal.

Systems of varied design have been proposed for the recovery of silver from photographic processing liquids and the like. In each of these systems, the silver-bearing liquid is fed through one or more silver recovery cartridges filled with a reaction medium such as a mass of iron wool, iron wire screen or iron particles. Under standard conditions, the silver ions in the liquid undergo exchange reactions with the ferrous ions of the reaction medium. The silver is, thus, precipitated from the liquid in the form of a thin coating upon the steel wool and a dense sludge that accumulates at the bottom of the silver recovery cartridge.

A principal disadvantage of the silver recovery systems currently available is that the waste holding tank is often remotely positioned from its associated silver recovery cartridge(s). The relatively long hoses utilized to connect the elements together, then, must be carefully handled to avoid their kinking or severing which may result in uncontained spills of silver-bearing liquid. The remote positioning of the holding tank from the silver recovery cartridge(s) also requires excessive floor space and presents obvious difficulties when movement of the system is required. A need, therefore, exists for a compact silver recovery system that may be readily transported and is capable of safely containing spills that may occur due to operator carelessness, etc.

SUMMARY OF THE INVENTION

In light of the deficiencies presented by the prior art silver recovery systems, it is a principal object of the present invention to provide a system for recovering silver from such diverse liquids as the wash waters and fixers employed in the development of photographic films, papers and the like that is lightweight and compact in size for enhanced mobility in confined work environments.

It is another object of the invention to provide a silver recovery system having means for containing silver-bearing liquid in the event that such is inadvertently spilled during system use.

It is an additional object of the invention to provide a silver recovery system wherein a positive hydrostatic head is maintained between a pair of silver recovery cartridges of the ion exchange type to prevent liquid flow blockages from forming in the cartridges themselves and their connecting liquid transfer conduit.

It is an object of the invention to provide improved elements and arrangements thereof in a silver recovery system for the purposes described which is relatively inexpensive, dependable and fully effective in accomplishing its intended purposes.

Briefly, the silver recovery system in accordance with this invention achieves the desired objects by featuring a holding tank for receiving silver-bearing liquid having a removable cover. The cover includes a pair of vertically offset platform portions, each for receiving one of a pair of serially-connected silver recovery cartridges. Each cartridge contains a source of ions, above silver in electromotive force series, for reacting with silver-bearing liquid so that silver is recovered therein. A pump is secured to the cover for delivering silver-bearing liquid from the holding tank to each of the cartridges in succession. Should silver-bearing liquid be inadvertently spilled, the cover further includes a containment wall around its periphery for confining the spill. As a back-up measure, an overflow tank is positioned beneath the holding tank for receiving any silver-bearing liquid that may flow over the containment wall.

The foregoing and other objects, features and advantages of the present invention will become readily apparent upon further review of the following detailed description of the preferred embodiment, as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
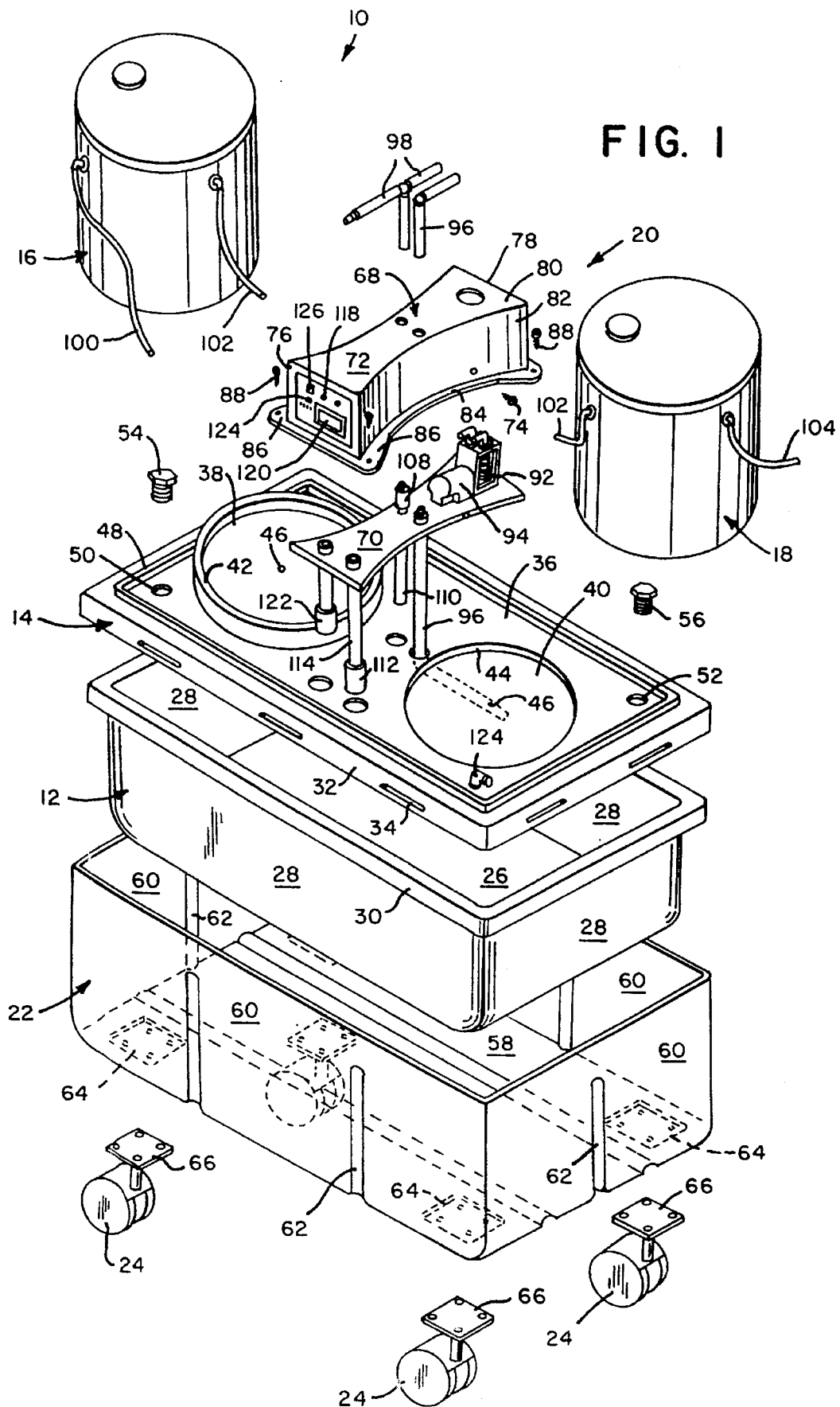
FIG. 1 is a perspective view of a silver recovery system in accordance with the present invention, exploded to show details thereof.

Referring now to FIG. 1, a silver recovery system in accordance with the present invention is shown generally at 10. As shown, the system 10 preferably includes an open-topped holding tank 12 having a split-level cover 14 adapted to carry a pair of silver recovery cartridges 16 and 18. Positioned directly between the cartridges 16 and 18 is a control unit 20 principally for delivering silver-bearing liquid contained in the holding tank 12 to the cartridges 16 and 18 in a regulated fashion. For ready transport over the ground surface, the holding tank 12 is positioned within a reinforced overflow tank 22 having casters 24 extending from the bottom thereof.

In the preferred embodiment of the invention, the holding tank 12 is provided with a box-like form being substantially rectangular in both horizontal and vertical cross section. The holding tank 12 thus includes a planar bottom wall 26 having four generally planar side walls 28 extending upwardly therefrom so as to define an open container having a capacity of approximately 12 gallons. For added strength, projecting outwardly from the side walls 28, about the open top of the holding tank 12, is a peripheral flange 30 having an inverted L-shape.

The holding tank 12 is formed of any material suitable for indefinitely containing a silver-bearing liquid of the type derived from photographic processes. In this regard, the holding tank 12 is preferably integrally molded of a thermoplastic composition such as polypropylene. It should, of course, be understood that the holding tank 12 may be fabricated of any other corrosion resistant material of suitable strength and durability.

The open top of the holding tank 12 is selectively closed by positioning the split-level cover 14 upon the peripheral flange 30. As shown, the cover 14 preferably includes a downwardly-projecting peripheral rim 32 adapted to closely engage the peripheral flange 30 of the holding tank 12 so as to prevent the relative lateral movement thereof. To selectively lock the cover 14 upon the holding tank 12, the peripheral rim 32 is provided with a plurality of inwardly-projecting fingers 34 positioned to frictionally engage the free end of the peripheral flange 30. As the cover 14, like the holding tank 12, is preferably integrally molded from a corrosion resistant and somewhat resilient material like polypropylene, the rim 32 may be slightly deformed to disengage the fingers 34 from the flange 30 so as to permit the cover 14 to be removed from the holding tank 12 when desired.

The cover 14 preferably includes: a base portion 36, an elevated platform portion 38 disposed above the base portion 36, and a recessed platform portion 40 disposed below the base portion 36. As shown, each of the platform portions 38 and 40 is circular in outline and is adapted to closely receive one of the silver recovery cartridges 16 and 18 therein. The elevated platform portion 38 is provided with a raised, circumferential ring 42 about its upper surface adapted to abut the sides of silver recovery cartridge 16 so as to prevent the lateral movement thereof during transport of the system 10. The side walls 44 of the recessed platform portion 40 serve as a similar abutment surface for the silver recovery cartridge 18.

For drainage of small volumes of silver-bearing liquid inadvertently spilled from the silver recovery cartridges 16 and 18 during their replacement, testing, etc., a relatively small drainage hole 46 is provided in each of the platform portions 38 and 40. With direct access to the open top of the holding tank 12 provided by each drainage hole 46, spilled silver-bearing liquid is free to flow under the influence of gravity directly into the holding tank 12 where it is collected and stored for later processing.

To contain relatively large amounts of silver-bearing liquid inadvertently spilled upon the cover 14, the periphery of the base portion 36 is upwardly formed so as to provide a low containment wall 48. Silver-bearing liquid collected upon the base portion 36 within the confines of the containment wall 48 may be drained into the holding tank 12 through one of a pair of relatively large openings 50 and 52 in opposing corners of the base portion 36. During normal use, however, the openings 50 and 52, having threads about their respective peripheries, are closed by suitably threaded plugs 54 and 56.

In the event that spilled silver-bearing liquid runs over the containment wall 48 of the cover 14, the overflow tank 22 is preferably positioned to catch the excess before it can pass in an uncontrolled manner onto the floor or other supporting surface for the system 10 where cleanup may be difficult. As shown, then, the preferred overflow tank 22 has a box-like shape adapted to partially receive the holding tank 12 within its open top. Because the preferred overflow tank 22 is relatively larger than the holding tank 12, approximately 2 gallons of overflowed silver-bearing liquid may be captured therein during an overflow situation. Of course, the storage capacity of the overflow tank 22 is merely exemplary as the volume of both the overflow tank 22 and the holding tank 12 may be varied as desired to suit the needs of a particular user.

Like the holding tank 12, the overflow tank 22 includes a bottom wall 58 having four side walls 60 extending upwardly therefrom. As shown, the bottom wall 58 and side walls 60 are dimensioned so as to form an opening in the top of the overflow tank 22 having of a size somewhat larger than that of the cover 14. Thus, overflowing silver-bearing liquid may pour directly from the cover 14 into the overflow tank 22.

Although any suitable material may be employed, the preferred overflow tank 22 is molded from polypropylene. For increased rigidity, however, the bottom and side walls 58 and 60 are provided with a plurality of integral recesses or grooves 62 extending across their respective surfaces. Caster mounting recesses 64 are provided in the bottom wall 58 alone for receiving the mounting platforms 66 of the casters 24 with a snap-type fit.

The base portion 36 of the cover 14 serves as a mounting surface and support for the control unit 20. As shown, the control unit 20 is provided with a two-piece housing 68 adapted for positioning between the elevated platform portion 38 and recessed platform portion 40 of the cover 14. The preferred housing 68 includes a base plate 70 for positioning directly upon the cover 14 and a lid 72 secured to the base plate 70 by threaded fasteners 74. The preferred lid 72 is provided with opposed front and back walls 76 and 78 integrally connected together by top wall 80 as well as side walls 82 having a concave shape so as to accommodate the silver recovery cartridges 16 and 18 with a minimal distance separating the silver recovery cartridges from one another.

Figure 2:
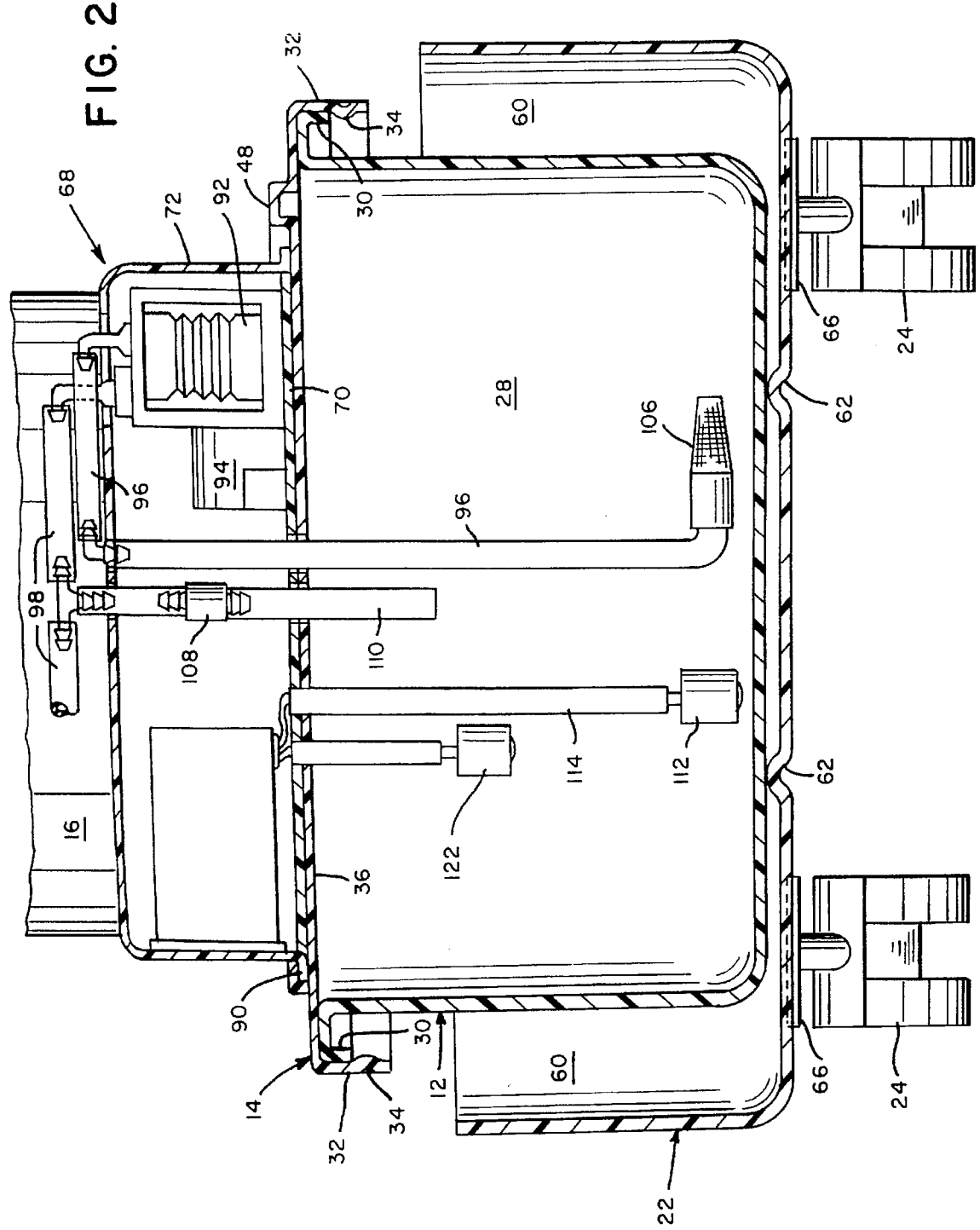
FIG. 2 is a transverse cross-sectional view of the silver recovery system.

For lateral stability of the housing 68, the bottom of the lid 72 is preferably provided with a peripheral flange 84 extending horizontally therefrom. As shown, at opposite ends of each of the concave side walls 82, the flange 84 widens somewhat to provide a fastening surface 86 through which a threaded fastener 88 may be easily passed to secure the control unit 20 to the cover 14. The portion of the flange 84 extending from the front wall 76, on the other hand, has been adapted for positioning within a cooperating slot or notch 90 (see FIG. 2) molded into the containment wall 48 to further secure the control unit 20 to the cover 14.

Mounted upon the base plate 70 is a positive displacement, bellows-type metering pump 92 driven by an electric motor 94. A metering pump suitable for use in the instant invention is model no. 16200-011 made by Gorman-Rupp Industries of Bellville, Ohio. Such a pump is capable of variably delivering from 7.5 to 75 cubic centimeters of silver-bearing liquid per minute to the silver recovery cartridges 16 and 18. Of course, pumps of the type described also have the advantage that their rate of liquid discharge can be selectively adjusted between the pump limits, thus permitting the residence time of the silver-bearing liquid in the cartridges 16 and 18 to be optimized.

A series of tubular conduits place the silver recovery cartridges 16 and 18 in fluid communication with the typically spent silver-bearing liquid contained in the holding tank 12 through the metering pump 92. In this regard, a suction conduit 96 connects the inlet side of the metering pump 92 with the holding tank 12. A discharge conduit 98, on the other hand, connects the outlet side of the metering pump 92 with the inlet conduit 100 for the silver recovery cartridge 16. A transfer conduit 102 serially connects the silver recovery cartridges 16 and 18 together by joining the outlet of silver recovery cartridge 16 and the inlet of silver recovery cartridge 18. A disposal conduit 104, connected to the outlet of silver recovery cartridge 18, permits the discharge of the processed silver-bearing liquid into a sewer drain or storage vessel (not shown).

Particulate matter suspended in the silver-bearing liquid can damage the metering pump 92. For this reason, a filter screen 106 of suitable mesh is secured to the free end of the suction conduit 96 suspended near the bottom of the holding tank 12. In the event, however, that precipitated silver sludge or other matter accumulates upstream of the metering pump 92 to the point where liquid flow through the system is blocked, a pressure relief valve 108 is in fluid communication with the discharge conduit 98. Thus, if the pressure in the discharge conduit 98 reaches a predetermined level, the relief valve 108 opens and diverts silver-bearing liquid into an associated relief conduit 110 which opens into the holding tank 12.

Each of the silver recovery cartridges 16 and 18 is of conventional construction and preferably contains a reaction medium such as a mass of iron wool, iron wire screen or iron particles for precipitating silver from the liquid being processed. When filled with silver bearing liquid, the silver recovery cartridges 16 and 18, which may have an individual capacity of several gallons, become relatively heavy. The physical handling of the silver recovery cartridges 16 and 18 is minimized, however, by the provision of casters 24 to bottom wall 58 of the overflow tank 22 which bears the load of the silver recovery cartridges.

A first float-actuated switch 112 regulates the operation of the metering pump 92. As shown, the switch 112 is suspended by a conduit 114 from the cover 14 into the holding tank 12. The conduit 114 houses the electrical leads 116 from the switch 112 isolating such from the silver-bearing liquid in the holding tank thereby preventing the electrical leads from posing a shock hazard.

Figure 3:
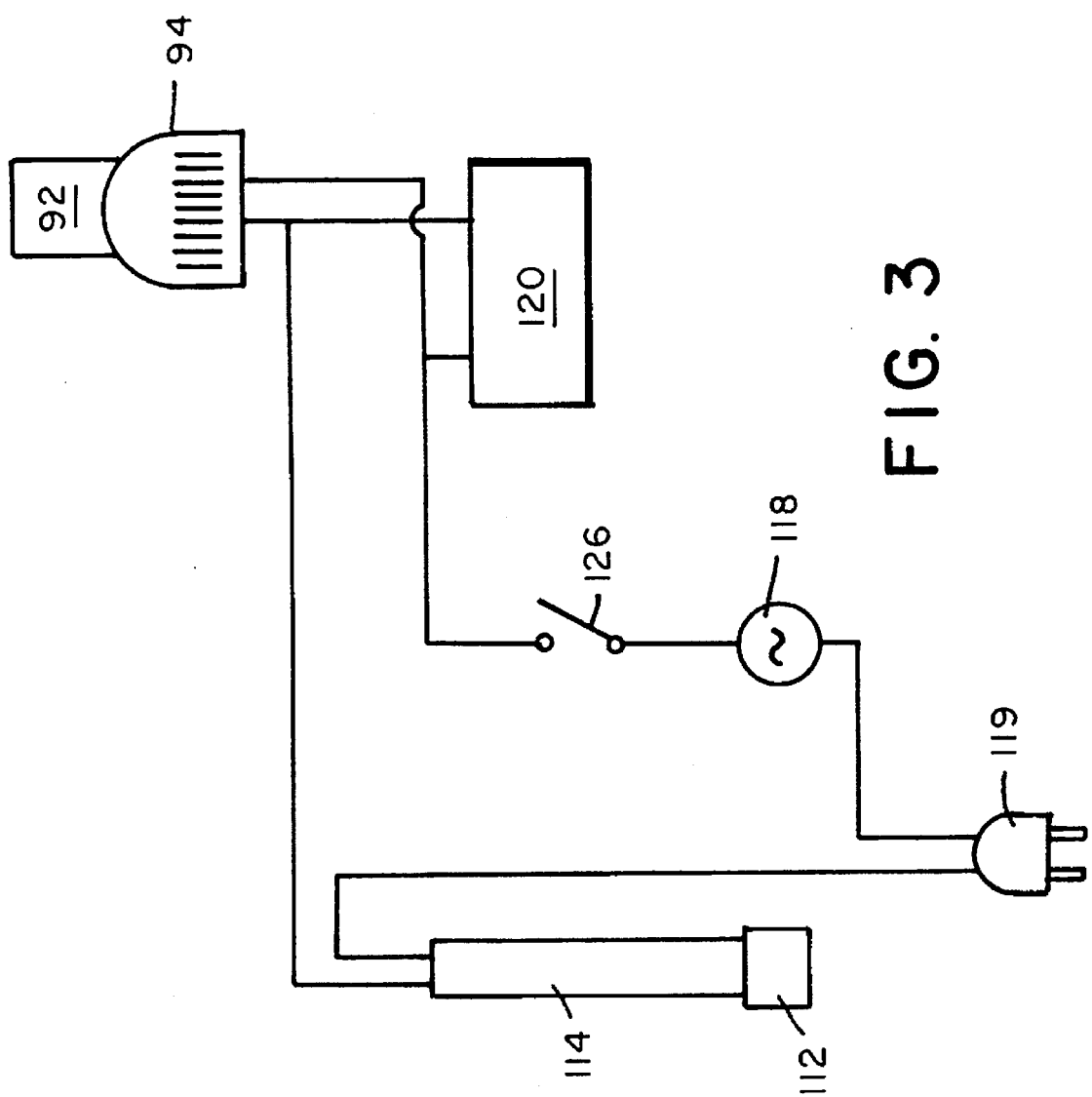
FIG. 3 is an electric circuit diagram for the silver recovery system.
Figure 3A:
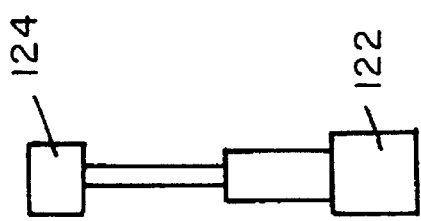
FIG. 3A is an electric circuit diagram illustrating a switch for actuating an auxiliary alarm which may be employed in conjunction with the silver recovery system.

As shown schematically in FIG. 3, the float-actuated switch 112 is connected in electrical series with the metering pump 92 and fuse 118 to a conventional plug 119 adapted for connection to an AC power source. When the liquid in the holding tank 12 rises to a predetermined level so as to close the float-actuated switch 112, the motor 94 is activated to deliver liquid from the holding tank 12 by means of pump 92 into and through the serially connected silver recovery cartridges 16 and 18 at a controlled rate. Subsequently, the motor 94 and metering pump 92 are de-energized when the level of the liquid in the holding tank 12 has been lowered to its original position.

Of course, by activating the metering pump 92 only when the silver bearing liquid in the holding tank 12 has reached a predetermined level and, then, not deactivating the pump until a lower level has been reached, a minimum volume of liquid will be pumped through the silver recovery cartridges 16 and 18 each time the metering pump 92 is activated. This volume may be so chosen that in each operating cycle of the metering pump 92, a sufficient volume of liquid is pumped through the silver recovery cartridges 16 and 18 to prevent flow-restricting gels or precipitates from accumulating in any of the tubular conduits 96, 98, 100, 102 and 104.

A total-elapsed-time timer 120 is electrically connected in parallel with the metering pump 92 and provides a visual reference to the operator of how long the metering pump 92 has been actuated in each operating cycle of the timer. Since the useful life of the reaction medium in the silver recovery cartridges 16 and 18 has been found to remain relatively constant from cycle to cycle, the time indicated by timer 120 suggests when the silver recovery cartridges 16 and 18 have reached the end of their useful lives. With this data readily available, the operator may replace the silver recovery cartridges 16 and 18 without guesswork. Of course, it is important that the silver recovery cartridges 16 and 18 be replaced before the reaction medium therein is completely consumed by ion exchange reactions so as to prevent the inadvertent discharge of unprocessed silver-bearing liquid into the sewer drain.

An auxiliary overflow alarm (not shown) may be employed to alert an operator that the holding tank 12 has been filled with an excessive amount of silver-bearing liquid due to a malfunction, conduit blockage, etc. Although not part of the invention, it is contemplated that the overflow alarm would include, in electrical series, an independent power source, such as a battery, and a buzzer, bell or flashing light. Through suitable electrical leads, the overflow alarm would be operatively connected through a conventional electrical jack 124 on the front wall 76 of lid 72. The jack 124 is, in turn, operatively connected to a second float-actuated switch 122 suspended from the cover 14 of the holding tank 12 to sound whenever the level of liquid in the holding tank reaches the level of float-actuated switch 122 positioned at a height somewhat above that of the first float-actuated switch 112. Preferably, the alarm will remain energized until the level of the liquid in the holding tank 12 drops below the level of the second float-actuated switch 122.

Should an operator be unable to attend to the system 10 in the event of an overflow, means are provided for conveying the excess silver bearing liquid to a remote storage tank without the danger of an uncontrollable spill. Thus, with reference back to FIG. 1, an overflow fitting may be seen to be secured to the base portion 36 of the cover 14. As shown, the fitting 124 comprises a conventional threaded ell to which may be secured an appropriate conduit to a location where excess liquid can be safely disposed of or held for later processing.

For operation of the system 10, the plug 119 is connected to a suitable power source and master switch 126 on the front wall 76 of lid 72 is manually closed. Assuming that an adequate volume of silver bearing liquid is present in holding tank 12, switch 112 will be closed thus energizing the motor 94 and its associated pump 92. By means of pump 92 silver bearing liquid is delivered to the silver recovery cartridges 16 and 18 at a predetermined rate.

Being first in the processing series, silver recovery cartridge 16 removes essentially all of the silver from the silver-bearing liquid. If, however, the reaction medium in silver recovery cartridge 16 was exhausted resulting in the discharge of unprocessed silver bearing liquid into transfer conduit 102, silver recovery cartridge 18, acting as a system back-up, would remove it from the liquid prior to discharge into disposal conduit 104. Nevertheless, by monitoring the elapsed processing time with the timer 120, inadvertent discharge of unprocessed silver-bearing liquid from cartridge 16 can be avoided.

Virtually total recovery of the silver is automatically attained through proper operation of the system 10. Post processing levels of silver in the treated liquid below 0.5 parts per million are typically reached. Such silver concentrations are low enough to comply with the most stringent pollution control regulations known.

While the invention has been described with a high degree of particularity, it will be appreciated by those skilled in the art that numerous modifications and substitutions may be made thereto. For example, the float-actuated switches for controlling the operation of the pump motor 94 described hereinabove have a number of well known equivalents. Thus, the silver-bearing liquid may be employed as an electrical conductor to bridge a pair of electrical contacts such as graphite rods suspended a fixed distance beneath the cover to close the motor power circuit. Therefore, it is to be understood that the present invention is not limited to the sole embodiment described above, but encompasses any and all embodiments within the scope of the following claims.

I claim:

1. A system for recovering silver from a silver-bearing liquid, comprising:

a holding tank for receiving silver-bearing liquid, said holding tank having an opening in its top;

a removable cover for closing said opening;

a first cartridge carried by said cover, said first cartridge adapted to contain a source of ions above silver in electromotive force series for reacting with silver-bearing liquid so that silver is recovered within said first cartridge;

a second cartridge carried by said cover and serially connected with said first cartridge, said second cartridge adapted to contain a source of ions above silver in electromotive force series for reacting with silver-bearing liquid so that silver is recovered within said second cartridge; and, a pump, having an inlet in fluid communication with said holding tank and an outlet in fluid communication with said first cartridge, secured to said cover for delivering silver-bearing liquid from said holding tank to said first and second cartridges.

2. The silver recovery system according to claim 1 wherein said holding tank includes a peripheral flange around the top thereof, and said cover includes a peripheral rim having inwardly projecting fingers for engaging said peripheral flange and firmly retaining said cover upon said holding tank.

3. The silver recovery system according to claim 1 wherein said cover further includes an elevated platform portion for supporting said first cartridge at an elevation above said second cartridge.

4. The silver recovery system according to claim 1 wherein said cover further includes a containment wall around its periphery for confining spilled silver-bearing liquid to said cover.

5. The silver recovery system according to claim 4 wherein said cover has a first drainage hole within the boundaries of said containment wall for diverting spilled silver-bearing liquid into said holding tank.

6. The silver recovery system according to claim 1 wherein said cover further includes:

a base portion;

an elevated platform portion disposed above said base portion for receiving said first cartridge; and, a recessed platform portion disposed in said base portion for receiving said second cartridge.

7. The silver recovery system according to claim 6 wherein said elevated platform portion has a second drainage hole for diverting spilled silver-bearing liquid into said holding tank and said recessed platform portion has a third drainage hole for diverting spilled silver-bearing liquid into said holding tank.

8. The silver recovery system according to claim 1 further comprising an overflow tank positioned beneath said holding tank for receiving spilled silver-bearing liquid.

9. The silver recovery system according to claim 1 further comprising a float-actuated switch suspended from said cover into said holding tank for actuating said pump when the level of silver-bearing liquid within said holding tank rises to a predetermined level.

10. A silver recovery system, comprising:

a holding tank for receiving silver-bearing liquid, said holding tank having an opening in its top;

a removable cover for closing said opening;

a first cartridge carried by said cover, said first cartridge adapted to contain a source of ions above silver in electromotive force series for reacting with silver-bearing liquid so that silver is recovered within said first cartridge;

a second cartridge carried by said cover and serially connected with said first cartridge, said second cartridge adapted to contain a source of ions above silver in electromotive force series for reacting with silver-bearing liquid so that silver is recovered within said second cartridge;

a pump, having an inlet in fluid communication with said holding tank and an outlet in fluid communication with said first cartridge, secured to said cover for delivering silver-bearing liquid from said holding tank to said first and second cartridges; and, a float-actuated switch suspended from said cover into said holding tank for actuating said pump in response to variations in the level of silver-bearing liquid within said holding tank.

11. The silver recovery system according to claim 10 further comprising an overflow tank positioned beneath said holding tank for receiving spilled silver-bearing liquid.

12. The silver recovery system according to claim 11 further comprising a plurality of casters secured to said overflow tank.

13. The silver recovery system according to claim 10 wherein said cover further includes:

a base portion;

an elevated platform portion disposed above said base portion for receiving said first cartridge; and, a recessed platform portion disposed in said base portion for receiving said second cartridge.

14. The silver recovery system according to claim 13 wherein said cover further includes a containment wall around its periphery for confining spilled silver-bearing liquid to said cover.

15. The silver recovery system according to claim 14 wherein said cover has a drainage hole within the boundaries of said containment wall for diverting spilled silver-bearing liquid into said holding tank.

16. A silver recovery system, comprising:

a holding tank for receiving silver-bearing liquid, said holding tank having an opening in its top;

an overflow tank positioned beneath said holding tank for receiving spilled silver-bearing liquid;

a removable cover for closing said opening in said holding tank, said cover including:
 a base portion;
 an elevated platform portion disposed above said base portion; and,
 a recessed platform portion disposed below said base portion;

a first cartridge positioned upon said elevated platform portion, said first cartridge adapted to contain a source of ions above silver in electromotive force series for reacting with silver-bearing liquid so that silver is recovered within said first cartridge;

a second cartridge positioned upon said recessed platform portion and serially connected with said first cartridge, said second cartridge adapted to contain a source of ions above silver in electromotive force series for reacting with silver-bearing liquid so that silver is recovered within said second cartridge;

a pump, having an inlet in fluid communication with said holding tank and an outlet in fluid communication with said first cartridge, secured to said cover for delivering silver-bearing liquid from said holding tank to said first and second cartridges; and, a float-actuated switch suspended from said cover into said holding tank for actuating said pump in response to variations in the level of silver-bearing liquid within said holding tank.

17. The silver recovery system according to claim 16 wherein said cover further includes a containment wall around its periphery for confining spilled silver-bearing liquid to said cover.

* * * * *